(12) United States Patent
Sivaram

(10) Patent No.: US 7,757,217 B2
(45) Date of Patent: Jul. 13, 2010

(54) DEBUGGING AN APPLICATION PROCESS AT RUNTIME

(75) Inventor: Rajini Sivaram, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 11/205,363

(22) Filed: Aug. 17, 2005

(65) Prior Publication Data

US 2006/0041866 A1 Feb. 23, 2006

(30) Foreign Application Priority Data

Aug. 17, 2004 (GB) ................................ 0418306.7

(51) Int. Cl.
*G06F 9/44* (2006.01)
*G06F 11/00* (2006.01)
(52) U.S. Cl. .................... 717/128; 717/166; 714/38; 714/45
(58) Field of Classification Search .............. 717/124, 717/128
See application file for complete search history.

(56) References Cited

U.S. PATENT DOCUMENTS

| | | | | | |
|---|---|---|---|---|---|
| 5,675,803 | A | * | 10/1997 | Preisler et al. | 717/131 |
| 5,953,530 | A | * | 9/1999 | Rishi et al. | 717/127 |
| 6,658,652 | B1 | * | 12/2003 | Alexander et al. | 717/128 |
| 7,032,217 | B2 | * | 4/2006 | Wu | 717/158 |
| 7,140,008 | B2 | * | 11/2006 | Chilimbi et al. | 717/158 |
| 2002/0129337 | A1 | | 9/2002 | Evans et al. | 717/124 |
| 2003/0028857 | A1 | * | 2/2003 | Zagorski et al. | 717/124 |
| 2004/0123271 | A1 | * | 6/2004 | Bindewald et al. | 717/124 |
| 2005/0091645 | A1 | * | 4/2005 | Chilimbi et al. | 717/130 |
| 2005/0091646 | A1 | * | 4/2005 | Chilimbi et al. | 717/130 |

OTHER PUBLICATIONS

IBM Developer Kit and Runtime Environment. Java 2 Technology Edition Version 1.3.1 Diagnostics Guide (2003).
Website: http://www.mathstat.dal.ca/-kassiem/HPC/commands/attach.html.
Website:http://msdn.microsoft.com/library/en-us/vsdebugext/html/vxlrfenvdteprocessattach.as . . . .
IBM Developer Kit and Runtime Environment. Java 2 Technology Edition Version 1.3.1 Diagnostics Guide (2003) pp. 227-252.
http://msdn.microsoft.com/library/en-us/vsdebugext/html/vxlrfenvdteprocessattach.aspx; Author Unknown; "Attaching to a running program"; Web Site; Publisher: Microsoft Corp.; No other information available published online before Aug. 17, 2004, pp. 1-2.
http://mathstat.dal.ca/~kassiem/HPC/commands/attach.html; Author Kassiem; "Attach"; Web Site; Publisher: Dalhousie University; No other information available published online before Aug. 17, 2004, pp. 1-2.

* cited by examiner

*Primary Examiner*—Tuan Q Dam
*Assistant Examiner*—Zheng Wei

(57) ABSTRACT

The present invention accordingly provides an application debugger running in a process of a computer system comprising: a debugger memory heap; and an object copier for generating a stateful copy in the debugger memory heap of an application object at runtime wherein the application object is stored in an application memory heap of an application process.

13 Claims, 10 Drawing Sheets

DEBUGGING AN APPLICATION PROCESS AT RUNTIME

BACKGROUND OF THE INVENTION

This invention relates to debugging an application software process. In particular it relates to generating a stateful copy of application process objects at runtime.

Identification and correction of errors in software is an important part of the software development process. An error can manifest in many ways including an incorrect data value, an incorrect flow of application logic or a failure of all or part of a software application. More subtly, errors can result in synchronization and timing problems in the execution of an application which may be difficult or impossible to reproduce. Techniques can be employed at development time to diagnose and resolve errors.

One diagnosis technique involves embedding tracing instructions into a software application to provide trace information at runtime relating to the status and flow of the application. For example, trace information can be generated as textual strings or numerical identifiers providing contents of application data structures. The inclusion of tracing instructions in a software application increases the overall size of the application and affects the runtime performance of the application because resources are consumed at runtime in order to generate trace information. Tracing instructions are therefore not suitable for a production software application where application size and performance are paramount. Furthermore, the continued generation of diagnosis trace information is dependent upon continued and stable operation of the application at runtime. If the application becomes unstable (for example, if a synchronization deadlock occurs or the application fails completely) the generation of trace information will cease. Furthermore, the trace information generated by the application at runtime are determined by the tracing instructions embedded in the application at development time. A developer is not easily able to include additional tracing instructions or remove unnecessary tracing instructions without recompiling the application or implementing complex tracing configuration logic which would itself introduce a large performance overhead.

Another technique for the diagnosis of software errors involves the use of a software debugger. A debugger is a software program for locating operational errors in a software application. For example, a debugger enables a developer to step through a malfunctioning portion of a software application to examine data and check operational conditions. A debugger can be used with an application at runtime (known in the art as the process of debugging). For example, FIG. 1 illustrates an arrangement of a computer system 100 for diagnosing errors in an application process 104 at runtime in the prior art. The application process 104 is an object oriented Java application at runtime residing in a memory 106 of the computer system 100 (Java is a registered trademark of Sun Microsystems, Inc.). The application process 104 includes an application heap 108 which is a reserved area of memory for the storage of application data at runtime. The application heap 108 includes application object 1082. Application object 1082 is a Java object which is an instance of a Java class. Application object 1082 includes an identifier of the Java class of which it is an instance. The application process 104 also includes debug logic which provides debug events for inter operation with a debugger. For example, the application process 104 can be executed with the "-Xdebug" Java runtime option to provide this debug logic. Application class files 110 are Java class files including Java bytecodes defining the object oriented classes for the application process 106. In particular, application class files 110 include a class definition corresponding to the application object 1082. The Java bytecodes which comprise the application class files 110 define both data (attributes) and functionality (software methods) of the class corresponding to the application object 1082.

A debugger is represented as debug process 102 which also resides in the memory 106 of the computer system 100. For example, the debug process 102 is the Java debugger "jdb". The debug process 102 can alternatively reside in a memory of a remote computer system. The debug process 102 and the application process 104 are separate processes which can operate on the computer system 100 independently of each other. The debug process 102 is described as an "out of process" debugger since it operates outside the application process 104. The debug process 102 is communicatively connected to application process 104 via communications link 112. An example of communications link 112 is a sockets connection. The debug process 102 receives debug events from, and sends debug commands to, the application process 104. Alternatively, the communications link 112 can be formed by attaching the debug process 102 to the application process 104 using the UNIX "attach" command, as disclosed on the worldwide web at "www.mathstat.dal.ca/~kassiem/HPC/commands/attach.html" (UNIX is a registered trademark of The Open Group). As a further alternative, the "Attach" method of the "Process" object in the Visual Studio Debugger Object Model distributed by the Microsoft Corporation provides equivalent functionality as disclosed on the worldwide web at "msdn.microsoft.com/library/default.asp?url=/library/en-us/vsdebugext/html/vxlrfenvdteprocessattac h.asp" (Visual Studio is a registered trademark of Microsoft Corporation). An advantage of using the "attach" command or the "Attach" method to form communications link 112 is that the debug process 102 becomes functionally attached to the application process 104 and the debug process 102 is able to access the application heap 108.

In these ways the debug process 102 is able to interact with the application process 104. A software developer is able to use the debug process 102 to step through the logic of the application process 104 and interrogate values of objects stored in the application heap 108 at runtime. However, the use of a debug process such as that described above has many disadvantages that render it impractical for a production application. In particular, the requirement that the application process 104 include debug logic for providing debug events (such as through the "-Xdebug" Java runtime option) results in the application process 104 occupying more of the memory 106 of the computer system 100, and a reduced runtime performance in terms of speed of execution. In a production system, resource efficiency and runtime performance can be paramount characteristics of an application process. Furthermore, the need for the application process 104 to include debug logic can prevent the use of runtime optimizations in the application process 104, such as the use of a "just-in-time" compiler (JIT).

Also the inclusion of additional debug logic in the application process 104 will change the timing characteristics of the application process 104 during execution. For example, application functionality of the application process 104 may execute at different points in time during execution of the application process 104 depending upon the inclusion of debug logic. This results from the additional time spent executing debug logic which has a knock-on effect on the particular time application functionality is executed. Consequently, timing sensitive errors such as synchronization locks and deadlocks may manifest differently in an application process executed with the "-Xdebug" option, and these errors may not be reproducible when the "-Xdebug" option is selected.

Additionally the effectiveness of a debug process is reliant upon the integrity and stability of the application process 104 at runtime as the application process 104 must execute debug logic and generate debug events. Thus the application process 104 must be stable enough to provide the required debug events for cooperation with a Java debugger. Where application stability and integrity cannot be assured (such as when an error is present) then debug events may not be generated so preventing effective debugging.

SUMMARY OF THE INVENTION

The present invention accordingly provides, in a first aspect, an application debugger running in a process of a computer system comprising: a debugger memory heap; and an object copier for generating a stateful copy in the debugger memory heap of an application object at runtime wherein the application object is stored in an application memory heap of an application process. Thus an application debugger in accordance with the present invention is able to interrogate and manipulate a stateful copy of the application object which is generated in the debugger memory heap. This allows the debugger process to diagnose errors and problems with an application process independently of the operational status of the application process and without requiring the application process to generate debug events or debug information. Thus, the debug process is not dependent on the stability and integrity of the application process. Further, the application process can be executed in a fully optimized manner, for example, using a JIT, so that there is no impact on the runtime performance of the application process.

Preferably the application debugger further comprises a class file loader for loading a class definition for said application object. This provides the advantage that methods can be executed for the copy of the application object. Further, the class definition for the application object may be a debug version of a class definition which is different from a production version of the class definition. A debug version of a class definition can provide additional debug functionality, such as additional methods.

Preferably the application object includes a data field and the object copier further generates a stateful copy of the data field in the stateful copy of the application object. This provides the advantage that the full state of data fields in the application object is available to the application debugger.

Preferably the data field is a reference to a second application object and the object copier further generates a stateful copy of said second application object. This provides the advantage that a non-primitive object reference in the application object is available to the application debugger.

Preferably the application memory heap is recorded in a dump file. This provides the advantage that the application object at runtime is stored in a dump file which can be read by the application debugger post-runtime and which can form the basis of a stateful copy of the application object.

The present invention accordingly provides, in a second aspect, a method for debugging an application process including an application memory heap, the method comprising: accessing the application memory heap; locating an application object in the application memory heap; generating a stateful copy in a debugger memory heap of the application object at runtime.

The present invention accordingly provides, in a third aspect, a computer program product comprising computer program code stored on a computer readable storage medium which, when executed on a data processing system, instructs the data processing system to carry out the method described above.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENTS

Figure 1:
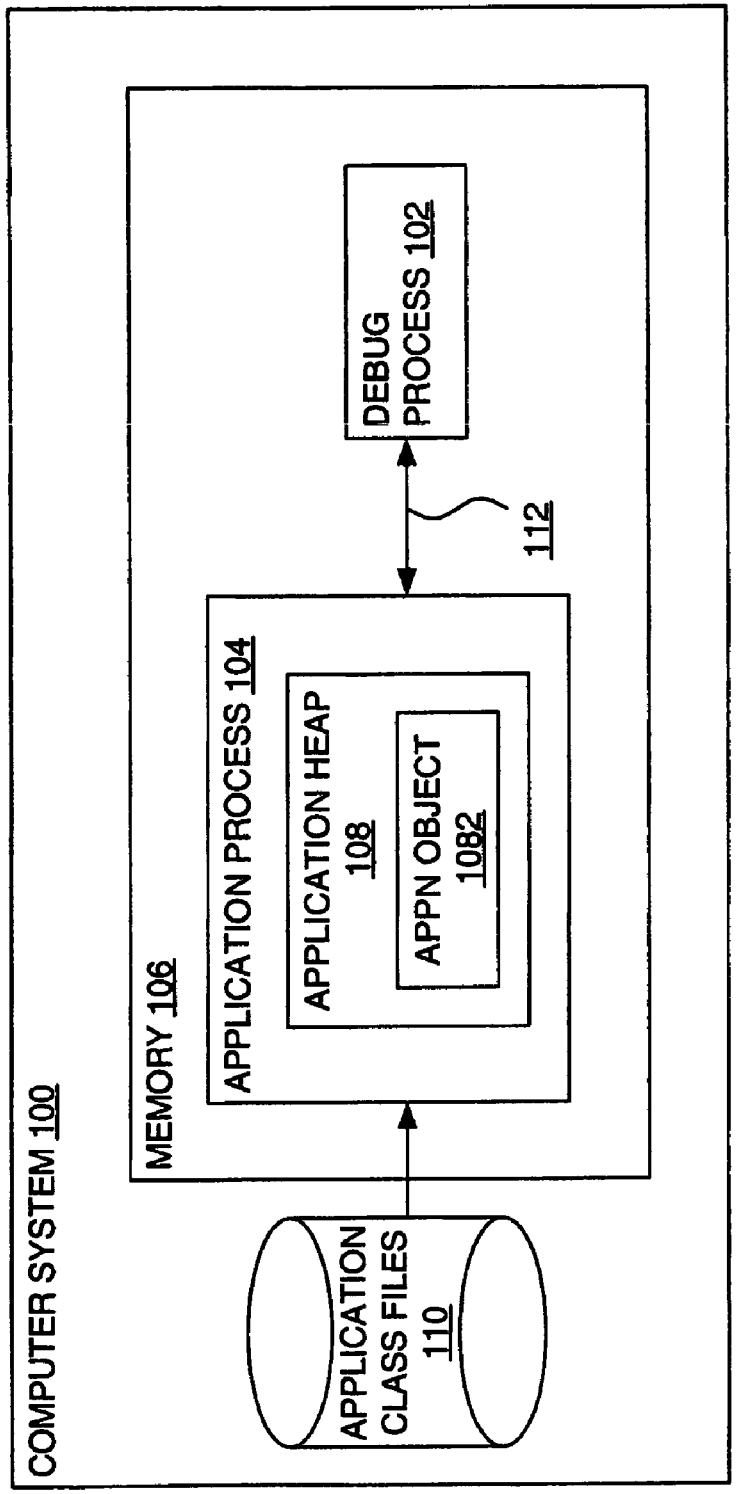
FIG. 1 illustrates an arrangement of a computer system for diagnosing errors in an application process at runtime in the prior art.
Figure 2:
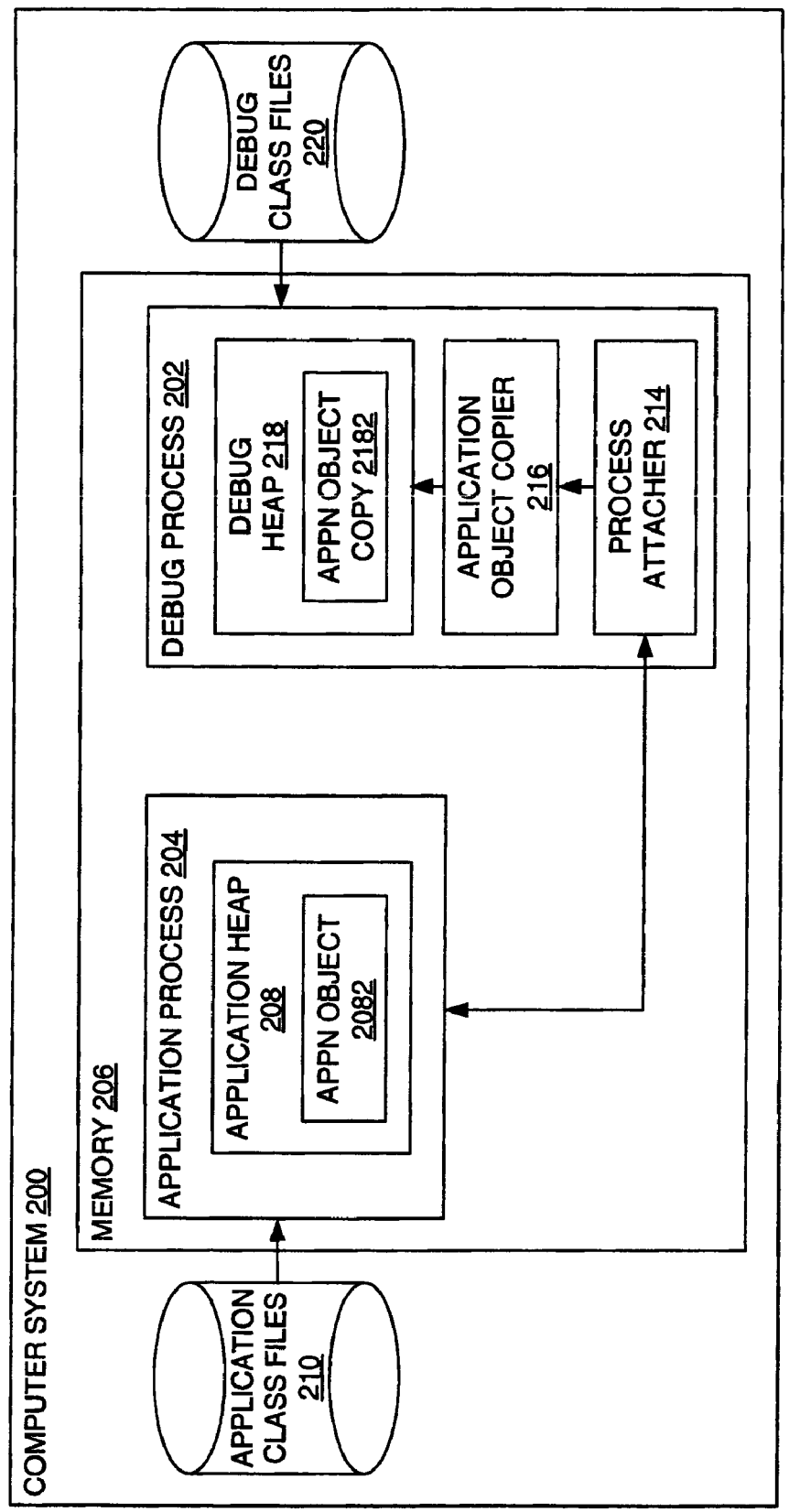
FIG. 2 illustrates a first arrangement of an application process and a debug process at runtime in accordance with a preferred embodiment of the present invention.

FIG. 2 illustrates a first arrangement of an application process 204 and a debug process 202 at runtime in accordance with a preferred embodiment of the present invention. Many of the elements of FIG. 2 are identical to those described above with respect to FIG. 1 and these will not be repeated here. In contrast with FIG. 1 the application process 204 of FIG. 2 does not include debug logic which provides debug events for inter operation with a debugger. Rather, the application process 204 can be optimized for execution as a production application (i.e. the application process can be executed without the "-Xdebug" Java runtime option specified).

FIG. 2 includes an out of process debugger represented as debug process 202. The debug process 202 includes a process attacher 214, an application object copier 216 and a debug heap 218. The debug heap 218 is a reserved area of memory in the debug process 202 for the storage of data at runtime. The process attacher 214 is a software function for attaching the debug process 202 to the application process 204 so that the debug process 202 can access the application heap 208 of the application process 204. For example, the process attacher 214 can use the UNIX "attach" command or the "Attach" method of the "Process" object in the Visual Studio Debugger Object Model as described earlier. The application object copier 216 is a software component for generating a copy of the application object 2082 in the debug heap 218 as application object copy 2182. A preferred method for performing this copy in accordance with embodiments of the present invention is considered in detail below with respect to FIG. 7.

FIG. 2 further includes debug class files 220 which are Java class files including Java bytecodes defining the object oriented classes for the application process 204. In particular, debug class files 220 includes a class definition corresponding to application object 2082, and therefore also corresponding to the application object copy 2182. The debug class files 220 can be identical to the application class files 210. Alternatively, the debug class files can contain additional software methods to assist with diagnosis of errors at runtime, such as additional debug methods for monitoring and manipulating the application object copy 2182.

The debug process 202 loads a class from debug class files 220 corresponding to the application object copy 2182. Since the debug process 202 operates independently of the application process 204, the debug process 202 is able to interrogate and manipulate the application object copy 2182 irrespective of the state of the application process 204. For example, if application process 204 is in an error state or a deadlock state, debug process 202 can copy application object 2082 and diagnose the error by interrogating and manipulating the application object copy 2182. Software methods in the application object copy 2182 can be executed using the definition of the class corresponding to the application object copy 2182 in debug class files 220. Such software methods can be used to interrogate and manipulate the application object copy 2182 irrespective of the state of the application process 204. Furthermore, since the application object 2082 is copied by the debug process 202, the application process 204 does not require any additional debug logic and consequently the performance, timing and synchronization of application process 204 is not impeded by the debug process 202.

Figure 3:
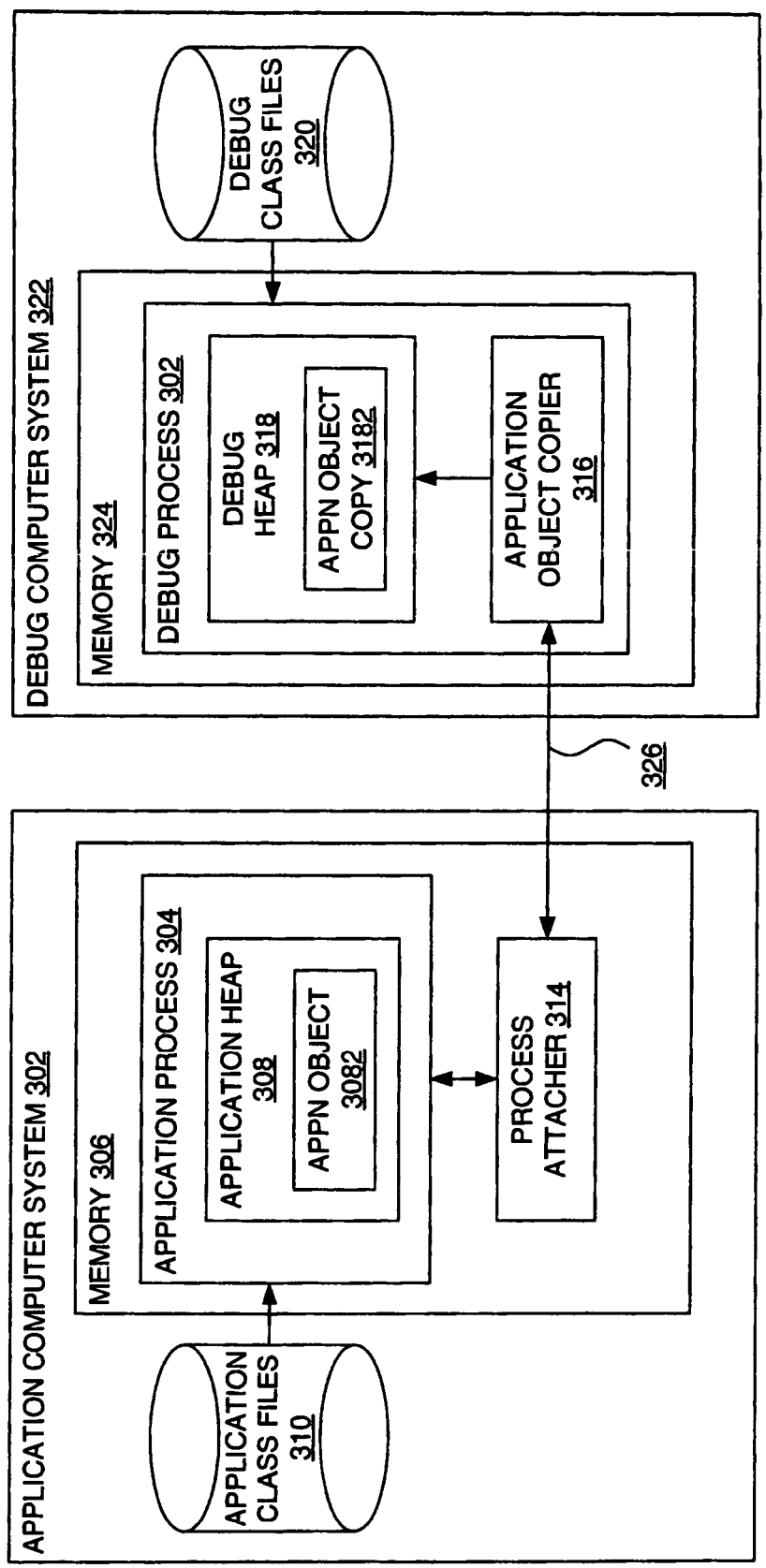
FIG. 3 illustrates a second arrangement of an application process and a debug process at runtime in accordance with a preferred embodiment of the present invention.

Two alternative but functionally equivalent arrangements of an application process and debug process will now be described with respect to FIGS. 3 and 4. FIG. 3 illustrates a second arrangement of an application process 304 and a debug process 302 at runtime in accordance with a preferred embodiment of the present invention. Many of the elements of FIG. 3 are identical to those described above with respect to FIG. 2 and these will not be repeated here. The arrangement of FIG. 3 differs from that of FIG. 2 in that the debug process 302 resides in a memory 324 of a debug computer system 322 which is separate from an application computer system 302 on which the application process 304 executes. In the arrangement of FIG. 3 the process attacher 314 resides as a separate software tool outside the debug process 302 and is communicatively connected to the application object copier 316 via the communications link 326. Communications link 326 can be any suitable mechanism for providing communications between the debug computer system 322 and the application computer system 302, such as a sockets connection. In the arrangement of FIG. 3 the process attacher 314 attaches to the application process 304 and provides the application object copier 316 with access to the application heap 308 via the communications link 326. In every other way the arrangement of FIG. 3 is functionally equivalent to the arrangement of FIG. 2.

Figure 4:
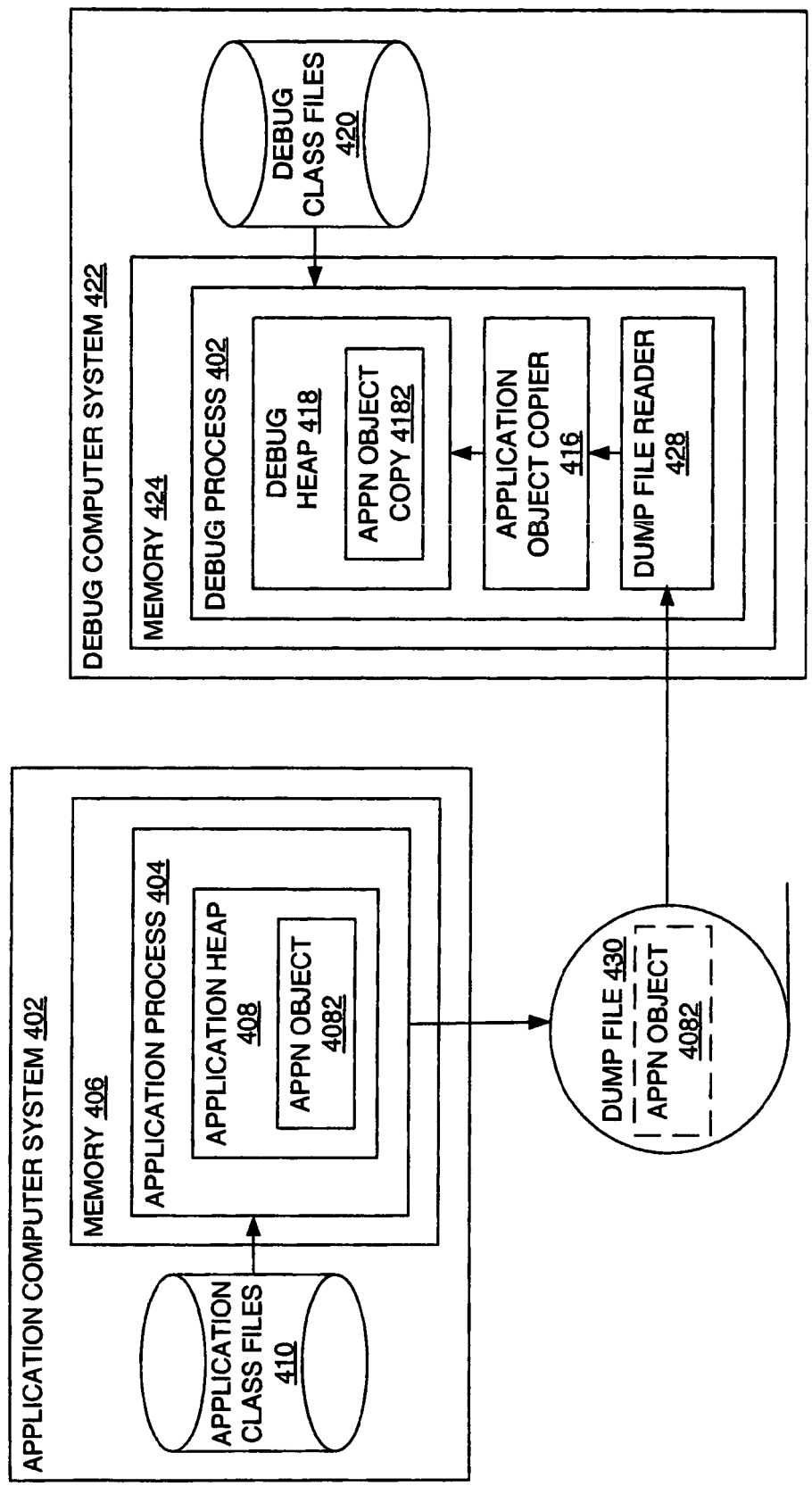
FIG. 4 illustrates a third arrangement of an application process and a debug process at runtime in accordance with a preferred embodiment of the present invention.

FIG. 4 illustrates a third arrangement of an application process 404 and a debug process 402 at runtime in accordance with a preferred embodiment of the present invention. Many of the elements of FIG. 4 are identical to those described above with respect to FIG. 3 and these will not be repeated here. The arrangement of FIG. 4 differs from that of FIG. 3 in that the application process 404 generates a dump file 430 containing the contents of the application heap 408. The generation of a dump file containing the contents of a memory heap is well known in the art. For example, a file containing a heap dump can be generated for an application process using the "-Xrunhprof:heap-dump" Java runtime option, or by sending a signal to the application process as is well known in the art. Once generated, the dump file 430 includes a representation of the application object 4082 because the application object 4082 was contained in the application heap 408. The debug process 402 of FIG. 4 includes a dump file reader 428 for reading the contents of the dump file 430. The dump file reader 428 is a software tool for reading the contents of the dump file 430. For example, the dump file reader 428 can be the "jformat" tool as disclosed in the IBM Developer Kit and Runtime Environment Java 2 Technology Edition Version 1.3.1 Diagnostics Guide available on the worldwide web at "www.ibm.com/developerworks/java/jdk/diagnosis/JTC0D100.pdf" (IBM is a registered trademark of International Business Machines Corporation). The application object copier 416 uses the dump file 430 as read by the dump file reader 428 to generate a copy of the application object 4082 as application object copy 4182 in the debug heap 418. In every other way the arrangement of FIG. 4 is functionally equivalent to the arrangement of FIG. 3.

Figure 5:
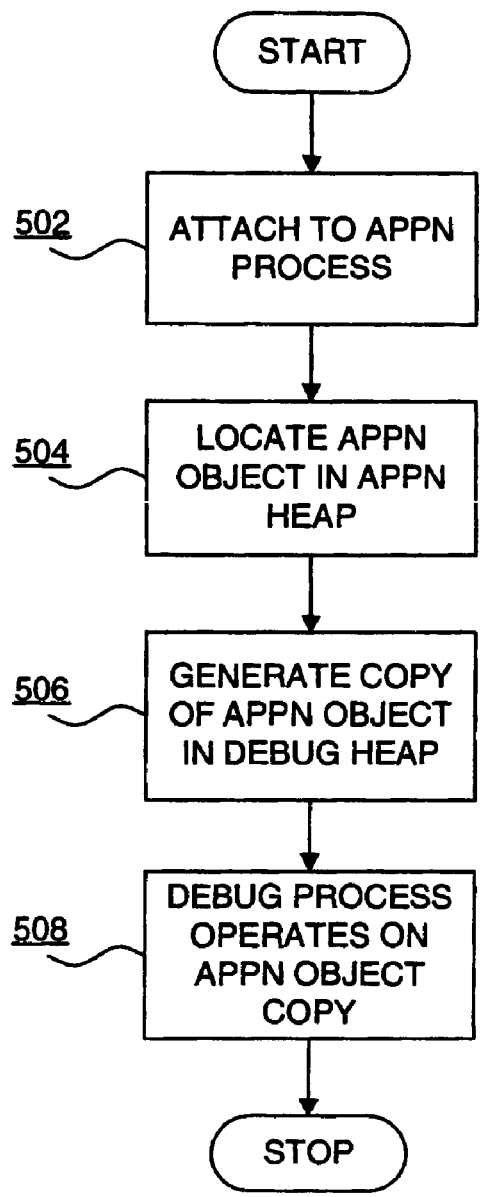
FIG. 5 is a flowchart illustrating a method of debugging the application process of FIG. 2 or 3 in a preferred embodiment of the present invention.
Figure 6:
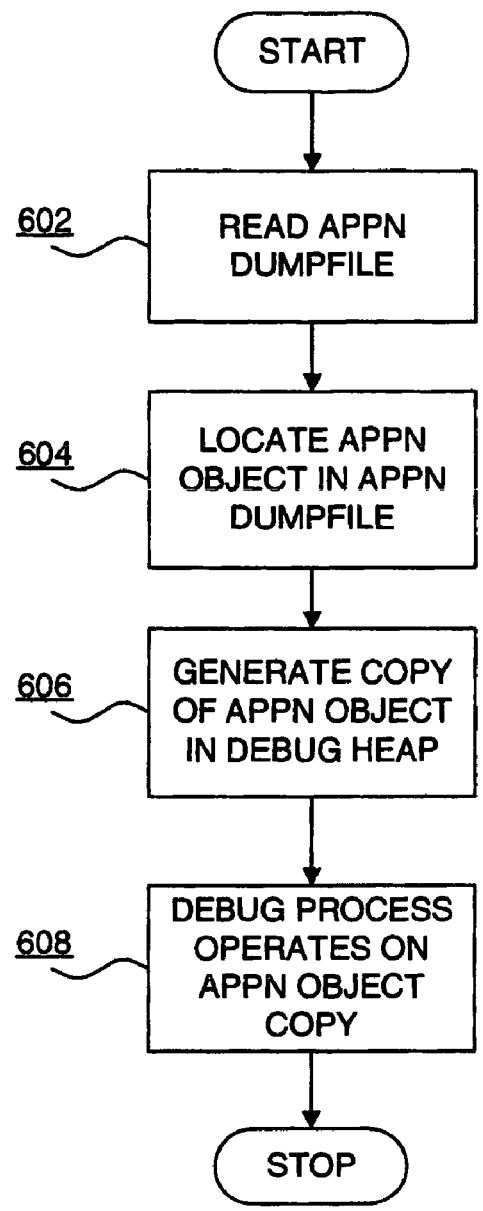
FIG. 6 is a flowchart illustrating a method of debugging the application process of FIG. 4 in a preferred embodiment of the present invention.

Methods will now be considered for debugging an application process in accordance with a preferred embodiment of the present invention with reference to FIGS. 5 and 6. FIG. 5 is a flowchart illustrating a method of debugging the application processes 204 or 304 of FIG. 2 or 3 in a preferred embodiment of the present invention. FIG. 5 will be described with reference to FIG. 2, although it will be clear to a person skilled in the art that FIG. 5 can also be employed for the functionally equivalent arrangement of FIG. 3. At step 502 the process attacher 214 attaches to the application process 204 in order to access the application heap. At step 504 an address of the application object 2082 is identified in the application heap 208. The address of the application object 2082 can be determined by scanning through all elements in the application heap 208 until an element corresponding to the application object 2082 is identified. This function is provided by the "heaproots" tool as disclosed in the IBM Developer Kit and Runtime Environment Java 2 Technology Edition Version 1.3.1 Diagnostics Guide available on the worldwide web at "www.ibm.com/developerworks/java/jdk/diagnosis/JTC0D100.pdf". Finally, at step 506, a copy of the application object 2082 is generated in the debug heap 218 as application object copy 2182. A method for generating the application object copy 2182 is described in detail below with reference to FIG. 7. Subsequent to step 508 the application object copy 2182 is stored in the debug heap 218 of the debug process 202 and the debug process 202 can interrogate and manipulate the application object copy 2182 to diagnose runtime errors in the application process 204.

FIG. 6 is a flowchart illustrating a method of debugging the application process 404 of FIG. 4 in a preferred embodiment of the present invention. At step 602 the dump file reader 428 reads the contents of the dump file 430 so that at step 604 a location of the application object 4082 can be identified in the dump file 430. The location of the application object 4082 can be determined by scanning through all elements in the dump file 430 until an element corresponding to the application object 4082 is identified. This function is provided by the "heaproots" tool as disclosed in the IBM Developer Kit and Runtime Environment Java 2 Technology Edition Version 1.3.1 Diagnostics Guide available on the worldwide web "www.ibm.com/developerworks/java/jdk/diagnosis/JTC0D100.pdf". Finally, at step 606, a copy of the application object 4082 is generated in the debug heap 418 as application object copy 4182. A method for generating the application object copy 4182 is described in detail below with reference to FIG. 7. Subsequent to step 608 the application object copy 4182 is stored in the debug heap 418 of the debug process 402 and the debug process 402 can interrogate and manipulate the application object copy 4182 to diagnose runtime errors in the application process 404.

Step 506 of FIG. 5 and step 606 of FIG. 6 generate a copy of an application object as an application object copy in the debug heap. The application object 2082 can contain one or more data fields in accordance with a class definition for the application object. The application object copy 2182 must also include details of these data fields. In Java, a data field in an application object can take one of two forms: a primitive data field; or a non-primitive data field. Primitive data fields are data fields which have one of the primitive Java data types (boolean, character, integer or floating-point). Non-primitive data fields are data fields which are themselves Java objects. When copying the application object 2082 it is therefore necessary to copy both primitive and non-primitive data fields. Primitive data fields are easily copied by value. However, non-primitive data fields are object references and in order to copy a non-primitive data field a copy must be made of the object referenced by the non-primitive data field.

Figure 7:
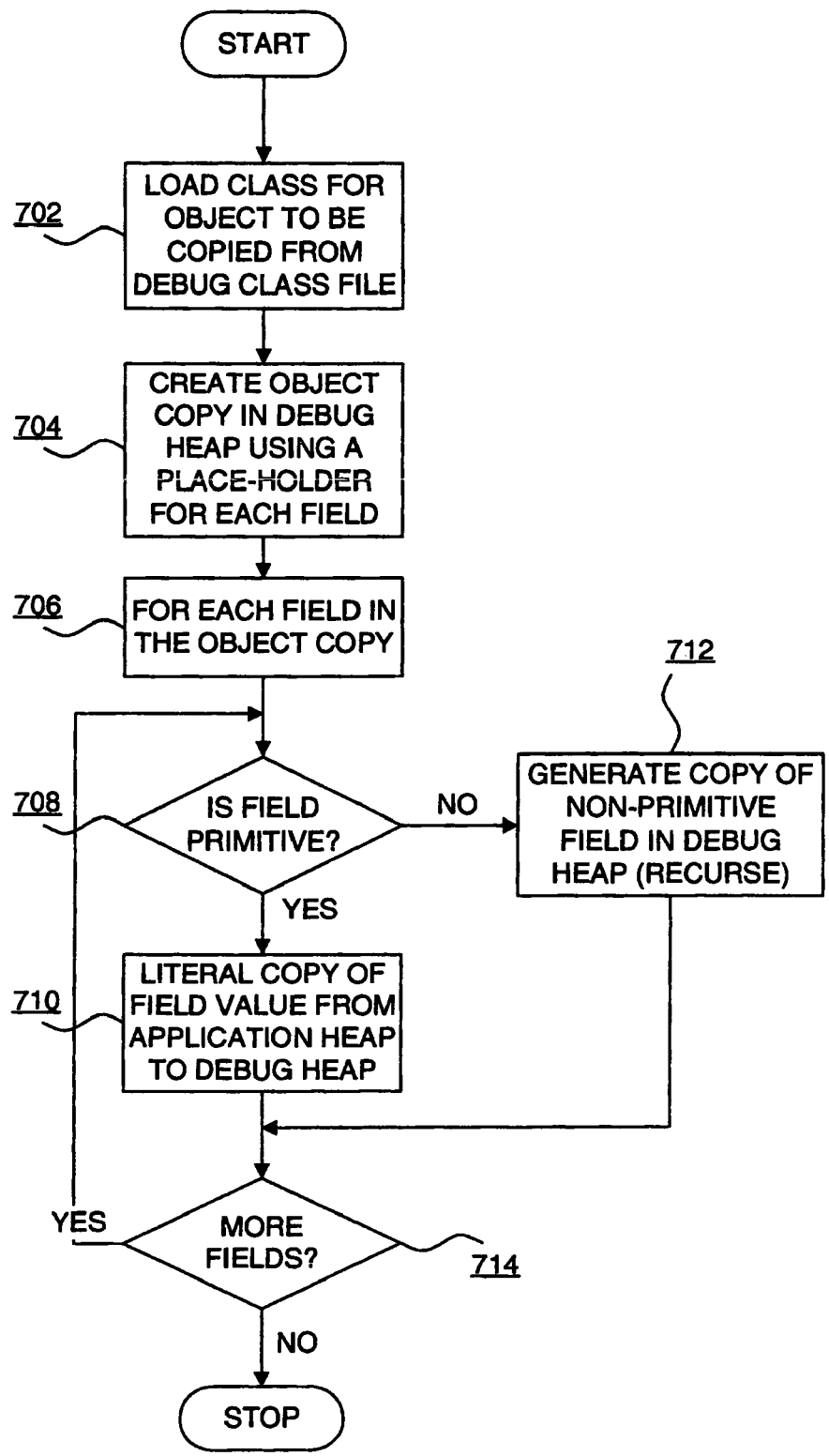
FIG. 7 is a flowchart illustrating a method for generating the application object copy of FIG. 2, 3 or 4 in a preferred embodiment of the present invention.

A method for generating an application object copy will now be considered with reference to FIG. 7. The method of FIG. 7 will be described with reference to the arrangement of FIG. 2 although it will be understood by a person skilled in the art that the method is equally applicable to the functionally equivalent alternative arrangements of FIGS. 3 and 4. FIG. 7 is a flowchart illustrating a method for generating the application object copy of FIG. 2, 3 or 4 in a preferred embodiment of the present invention. At step 702 a class definition for the application object 2082 is loaded from the debug class file 220. An indication of the Java class of the application object 2082 is included in the application object 2082. At step 704 an application object copy 2182 is created in the debug heap 218 as a new instance of the class definition loaded at step 702. The application object copy 2182 includes data fields in accordance with the class definition for the application object copy 2182. Initially, a default "placeholder" value is assigned to each of the data fields in the application object copy 2182 to indicate that a value from the application object 2082 has not yet been copied for each of the data fields. For example, the default "placeholder" value can be a special reserved value of a data field. Alternatively, fields can be assigned a default value of "0". At step 706 a loop is initiated through each of the fields in the application object copy 2182. For each field in the application object copy 2182 step 708 determines if the field is a primitive field. If the field is a primitive field a literal copy of the field value is made from the application object 2082 at step 710. Alternatively, if the field is a non-primitive field (i.e. an object reference), then a copy of the non-primitive field is generated at step 712. Step 712 involves using the method of FIG. 7 to generate a copy of the object referenced by the non-primitive field in the debug heap 2182. Finally, at step 714 the method tests if more fields are to be processed and the method loops to step 708 as appropriate.

In an alternative embodiment a partial copy of application object 2082 is generated as application object copy 2182. In a partial copy the application object copy 2182 includes a copy of the value of all primitive fields but no copies of non-primitive fields which are object references. In this alternative embodiment step 712 of FIG. 7 does not generate a copy of the non-primitive field of the application object 2082. Instead, step 712 can enter a placeholder value for a non-primitive field to indicate that the field has not been copied. The debug process 202 can subsequently generate an actual copy of non-primitive fields of application object copy 2182 using the method of FIG. 7 as desired.

An example of the preferred embodiment of the present invention in use will now be considered with reference to the arrangement of FIG. 2, and the methods of FIGS. 5 and 7. It will be apparent to persons skilled in the art that the example in use can also apply to the functionally equivalent arrangements of FIGS. 3 and 4, and the method of FIG. 6.

Below is a pseudo-code definition of a Java class "Rectangle" and a Java class "Point". The Rectangle class includes two integer primitive data fields: "width"; and "height". The Rectangle class further includes a non-primitive object reference to an instance of the Point class named "centre". A single method is also provided in the Rectangle class named "toString" which has no parameters and returns a string data item. The Point class includes two integer primitive data fields: "xCoord"; and "yCoord". A single method is also provided in the Point class named "toString" which has no parameters and returns a string data item. The class definitions are examples of classes which are stored in the application class files 210 and the debug class files 220. An application process 204 can instantiate objects in accordance with these class definitions as will be described below.

```
Class Rectangle
{
    int    width;       // primitive integer width
    int    height;      // primitive integer height
    Point  centre;      // non-primitive centre point
    // method to return
    string representa-
    tion of rectangle
    String toString( )
    {
        return      "Width:" + width +
                    " Height:" + height +
                    " Centre-Point:" + centre.toString( );
    }
}
Class Point
{
    int    xCoord;      // primitive integer x coordinate
    int    yCoord;      // primitive integer y coordinate
    // method to return string representation of point
    String toString( )
    {
        return      "X Coordinate:" + xCoord +
                    " Y Coordinate:" + yCoord;
    }
}
```

Figure 8:
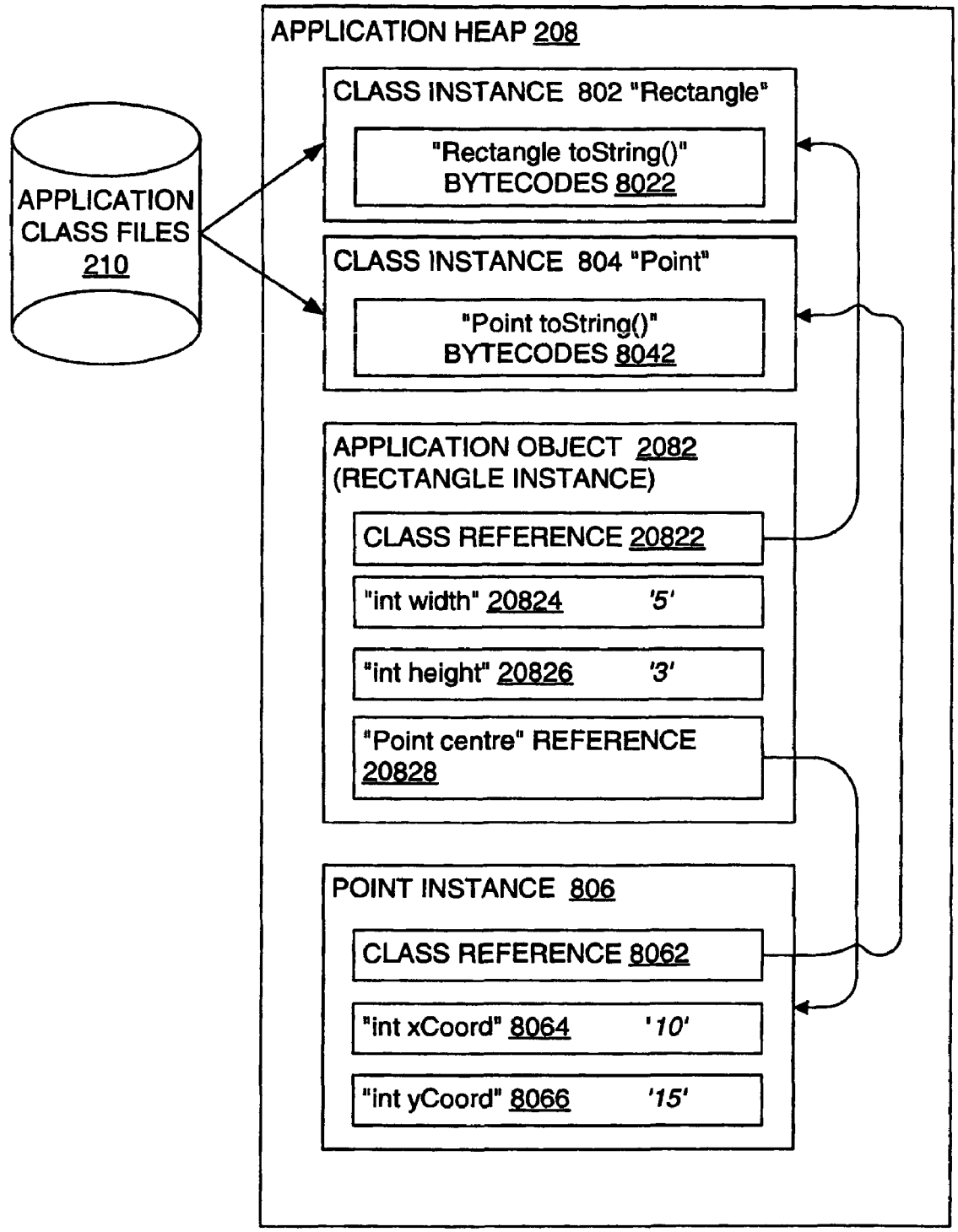
FIG. 8 is a schematic illustration of the application heap of FIG. 2 at runtime in accordance with a preferred embodiment of the present invention.

FIG. 8 is a schematic illustration of the application heap 208 of FIG. 2 at runtime in accordance with a preferred embodiment of the present invention. The application heap 208 includes application object 2082 which is an instance of the Rectangle class defined above. Application object 2082 includes a reference to Class instance 802 in the application heap 208. Class instance 802 is an instance of the well known Java class named "Class", or a descendent of "Class", and represents the class of the Rectangle object loaded from the application class files 210. Class instance 802 includes Java bytecodes 8022 corresponding to the toString method of the Rectangle class. The application object 2082 also includes the following data fields: width 20824 with a value of '5'; height 20826 with a value of '3'; and centre 20828 which is a reference to an instance of the Point class in the application heap 208. The object referenced by centre 20828 is a Point instance 806 and includes a reference to Class instance 804 in the application heap 208. Class instance 804 is an instance of the well known Java class named "Class", or a descendent of "Class", and represents the class of the Point object loaded from the application class files 210. Class instance 804 includes Java bytecodes 8042 corresponding to the toString method of the Point class. The point instance 806 also includes the following data fields: xCoord 8064 with a value of '10'; and yCoord 8066 with a value of '15'.

Figure 9A:
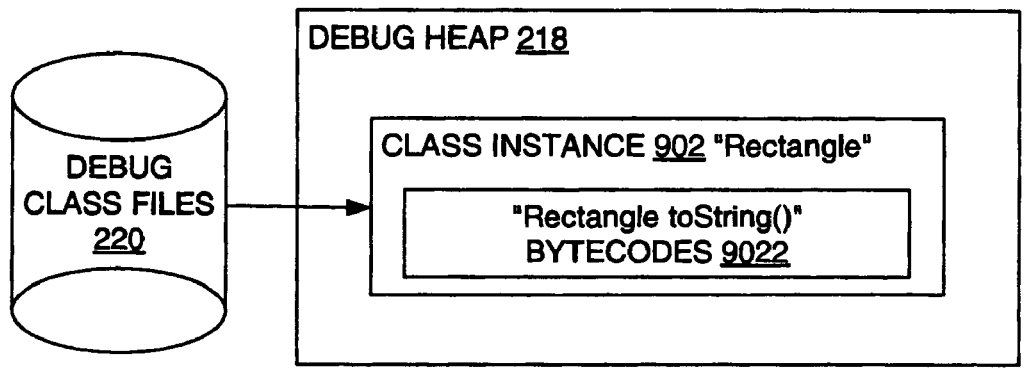
FIGS. 9a to 9c illustrate the debug heap of FIG. 8 during the method of FIG. 7 in accordance with a preferred embodiment of the present invention.
Figure 9B:
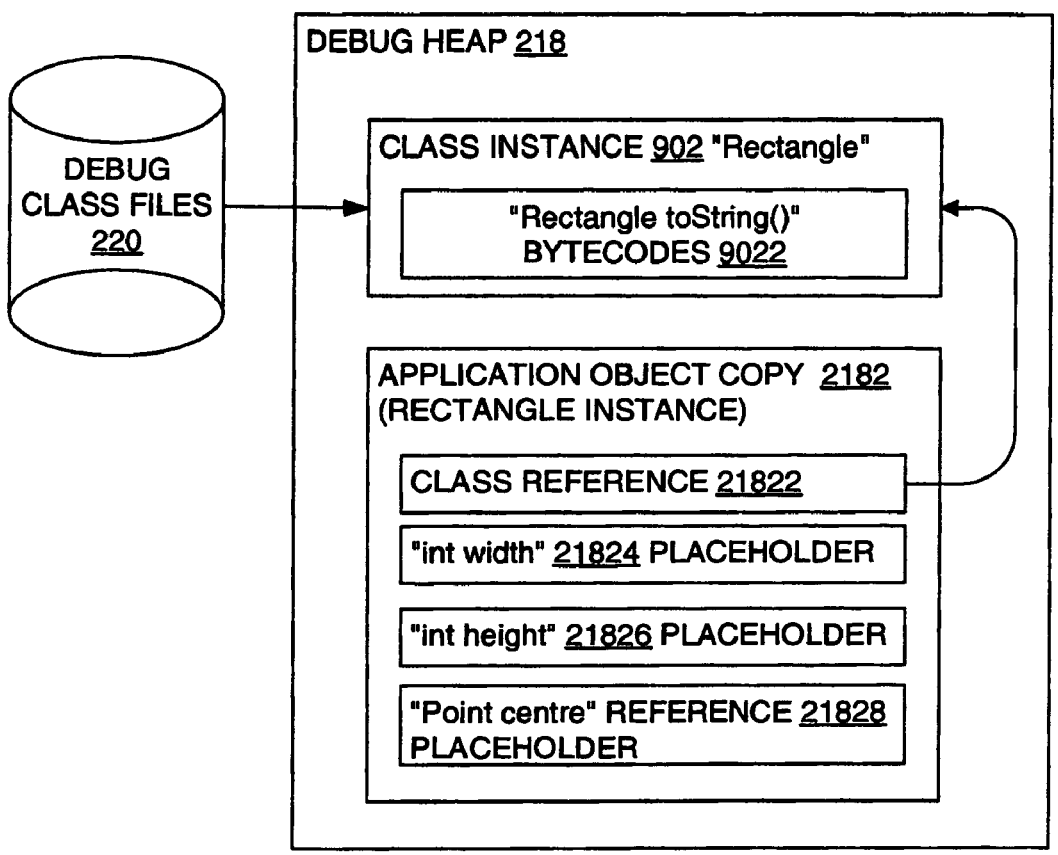

The method of FIG. 5 for debugging the application process 204 will now be considered for the particular arrangement of the application heap 208 of FIG. 8. At step 502 the application attacher attaches to the application process 204 such as has been previously described. At step 504 the application object 2082 is located in the application heap 208. At step 506 a copy of the application object is generated in the debug heap 218 using the method of FIG. 7. A first iteration of the method of FIG. 7 will now be considered to generate a copy of the application object 2082 in the particular arrangement of the application heap 208 of FIG. 8 with reference to FIGS. 9a to 9c. At step 702 the class for the application object 2082 is loaded from the debug class files 220 into the debug heap 218. The class of the application object 2082 can be determined by checking the class reference 20822 which refers to Class instance 802 for the Rectangle class. Thus, application object 2082 is an instance of the class Rectangle and it is the Rectangle class that is loaded from the debug class files 220 into the debug heap 218 at step 702. FIG. 9a illustrates the debug heap 218 after step 702 including a Class instance 902 which represents the Rectangle class loaded from the debug class files 220. At step 704 an application object copy 2182 is created in the debug heap 218 as a new instance of the Rectangle class with a placeholder value assigned to each of the data fields in the application object copy 2182. FIG. 9b illustrates the debug heap 218 after step 704 including application object copy 2182. The application object copy 2182 includes a reference 21822 to Class instance 902 in the debug heap 218. The application object copy 2182 also includes the following data fields: width 21824 with a placeholder value; height 22826 with a placeholder value; and centre 21828 with a placeholder value. At step 706 a loop is initiated through each of the fields width 21824, height 21826 and centre 21828. Considering field width 21824 first, at step 708 the method determines that width 21824 is a primitive integer field and at step 710 the literal value of the width 20824 field in the application object 2082 is copied as the value of the width 21824 field in the application object copy 2182. Similarly, at a second iteration of step 708 the method determines that height 21826 is a primitive integer field and at step 710 the literal value of the height 20826 field in the application object 2082 is copied as the value of the height 21826 field in the application object copy 2182. Subsequently, at a final iteration of step 708 the method determines that centre 21828 is a non-primitive object reference field and at step 712 a copy of the object referenced by the non-primitive field centre 20828 is generated using a second iteration of the method of FIG. 7.

Figure 9C:
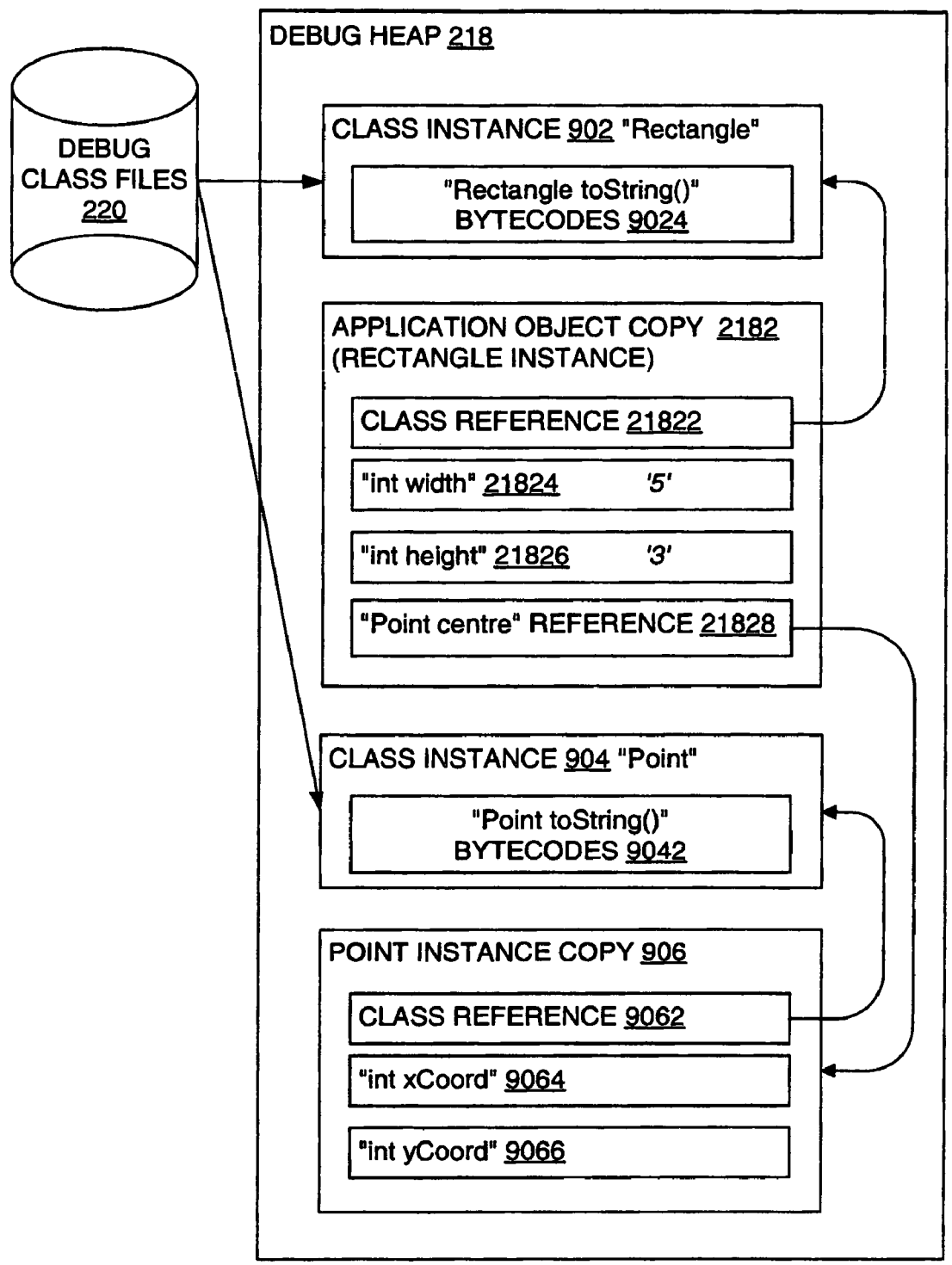

A second iteration of the method of FIG. 7 will now be considered to generate a copy of the Point instance 806 in the particular arrangement of the application heap 208 of FIG. 8. At step 702 the class for the Point instance 806 is loaded from the debug class files 220 into the debug heap 218. The class of the Point instance 806 can be determined by checking the class reference 8062 which refers to Class instance 804 for the Point class. Point instance 806 is an instance of the class Point and it is the Point class that is loaded from the debug class files 220 into the debug heap 218 at step 702. FIG. 9c illustrates the debug heap 218 including a Class instance 904 which represents the Point class loaded from the debug class files 220. At step 704 a point instance copy 906 is created in the debug heap 218 as a new instance of the Point class with a placeholder value initially assigned to each of the data fields in the point instance copy 902. The point instance copy 906 includes a reference 9062 to Class instance 904 in the debug heap 218. The point instance copy 906 also includes the following data fields: xCoord 9064 with an initial placeholder value; and yCoord 9066 with an initial placeholder value. At step 706 a loop is initiated through each of the fields xCoord 9064 and yCoord 9066. Considering field xCoord 9064 first, at step 708 the method determines that xCoord 9064 is a primitive integer field and at step 710 the literal value of the xCoord 8064 field in the Point object 806 of the application heap 208 is copied as the value of the xCoord 9064 field in the Point instance copy 906. Similarly, at a second iteration of step 708 the method determines that yCoord 9066 is a primitive integer field and at step 710 the literal value of the yCoord 8066 field in the application object 2082 is copied as the value of the yCoord 9066 field in the Point instance copy 906. Finally at step 714 the method determines that there are no more data fields in the Point instance copy 906 and the method returns to the first iteration of the method of FIG. 7. Similarly, at step 714 of the first iteration of the method of FIG. 7 the method determines that there are no more data fields in the application object copy 2182 and the method terminates.

Returning now to the method of FIG. 5 following the generation of the application object copy 2182 in the debug heap 218, at step 508 the debug process 202 is able to interrogate and manipulate the application object copy 2182. For example, the debug process 202 is able to read values of the data fields of the application object copy 2182 such as width 21824 and height 21826. The debug process 202 is also able to access non-primitive data fields of the application object copy 2182 such as the Point instance copy 906. Furthermore, the debug process 202 is able to execute methods of the application object copy 2182 and the Point instance copy 906 using the bytecodes 9022 and 9042 loaded from the debug class files 220. Thus, the debug process 202 is able to undertake debugging functionality on a copy of the application object 2082 without relying on the state of the application process 204, and without requiring the application process 204 to generate debug events or debug information.

The invention claimed is:

1. An application object debugger in a computer system comprising:
    an application object associated with an application object heap;
    a debugger associated with a debugger heap and having access to debug class files that define the application object;
    a process attacher for providing access to the application object heap independently of the application object;
    an object copier for generating a stateful application object copy of the application object in the debugger heap at runtime via the process attacher; and
    a class file loader for loading a class definition file or the debug class file for said application object copy from the debug class files,
    wherein the debug class file can be identical to the class definition file or contains additional software methods to assist the debugger to diagnose the application object copy at runtime,
    wherein the debugger is configured to interrogate and manipulate the application object copy independently of the application object.

2. The application debugger of claim 1, wherein: said application object includes a data field; and said object copier further generates a stateful copy of said data field in said stateful copy of the application object.

3. The application debugger of claim 1, wherein:
said application object includes a data field, said data field being a reference to a second application object; and
said object copier for further generating a stateful copy of the second application object in the debugger heap at runtime.

4. The application object debugger of claim 1, wherein:
said application object debugger executes in a process on a first computer system, and said application object executes on a second computer system; and said first computer system is communicatively connected to said second computer system.

5. The application object debugger of claim 1, wherein the application heap is recorded in a dump file and the debugger further comprises a dump file reader for reading the dump file.

6. A method for debugging an application process, the method comprising:
accessing an application heap independently of the application process;
locating an application object in the application heap;
generating a stateful copy in a debugger heap of the application object at runtime; and
loading a class definition file or a debug class file of the application object into the debugger heap,
wherein the debug class file can be identical to the class definition file or contains additional software methods to assist a debugger to diagnose the application object copy at runtime,
whereby the copy of the application object can be manipulated in the debugger heap independently of the application object.

7. The method of claim 6, wherein the application object includes a data field, and further comprising generating a stateful copy of the data field in the stateful copy of the application object in the debugger.

8. The method of claim 6, wherein the application object includes a data field, the data field being a reference to a second application object, and further comprising generating a stateful copy of the second application object in the debugger.

9. The method of claim 6 wherein:
the application heap is recorded in a dump file, and the accessing of the application heap step includes reading the dump file.

10. A computer usable medium embodying computer program code, the computer program code comprising computer executable instructions configured to form an application object debugger, including:
program code to access an application heap;
program code to locate an application object in the application heap independently of a corresponding application process;
program code to generate a stateful copy of the application object in a debugger heap of the application object at debugger runtime, and
program code to load a class file defining the application object or a debug class file into the debugger heap,
wherein the debug class file can be identical to the class definition file or contains additional software methods to assist the debugger to diagnose the application object copy at runtime,
whereby the debugger is able to interrogate and manipulate the copy of the application object independently of the application object.

11. The computer usable medium of claim 10, wherein the application object includes a data field, and wherein the embodied computer program code further comprises computer executable instructions configured to generate a stateful copy of the data field in the stateful copy of the application object.

12. The computer usable medium of claim 10, wherein the application object includes a data field, the data field being a reference to a second application object, and wherein the embodied computer program code further comprises computer executable instructions configured to generate a stateful copy of the second application object.

13. The computer usable medium of claim 10, wherein the embodied computer program code further comprises computer executable instructions configured to:
record the application heap in a dump file, and
the computer executable instructions to access the application heap further includes computer executable instructions to read the dump file.

* * * * *